W. M. ZIEGLER.
UNIVERSAL JOINT.
APPLICATION FILED OCT. 5, 1918.

1,367,578.

Patented Feb. 8, 1921.

Witness
Frank A. Fahle

Inventor
William M. Ziegler,
By Hood & Schley,
Attorneys

UNITED STATES PATENT OFFICE.

WILLIAM M. ZIEGLER, OF RICHMOND, INDIANA, ASSIGNOR TO THE NATIONAL AUTOMATIC TOOL COMPANY, OF RICHMOND, INDIANA, A CORPORATION OF INDIANA.

UNIVERSAL JOINT.

1,367,578.      Specification of Letters Patent.      Patented Feb. 8, 1921.

Application filed October 5, 1918. Serial No. 257,073.

*To all whom it may concern:*

Be it known that I, WILLIAM M. ZIEGLER, a citizen of the United States, residing at Richmond, in the county of Wayne and State of Indiana, have invented a new and useful Universal Joint, of which the following is a specification.

In that common type of universal joints comprising two end members, a coupling member, and pivot pins connecting the end members with the coupling member upon axes at right angles to each other, it is desirable that the pivot members be withdrawable and the object of my present invention is to provide an improved structure whereby the pivot pins may be firmly locked in place but the parts readily disassembled.

Figure 1:
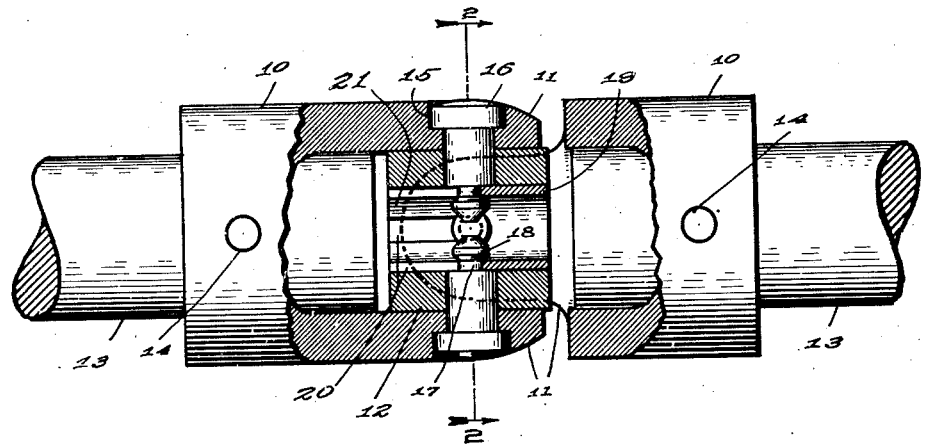
Figure 2:
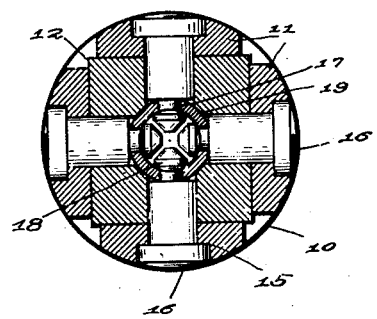
Figure 3:
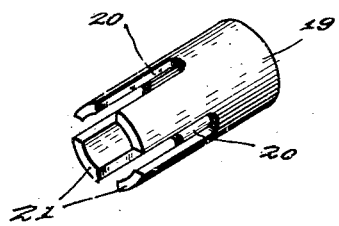

The accompanying drawings illustrate my invention. Figure 1 is a side elevation in partial axial section of an embodiment of my device; Fig. 2 a section on line 2—2 of Fig. 1; and Fig. 3 a perspective view of the locking sleeve.

In the drawings, 10, 10 indicate the end members of the joint, each provided with a pair of parallel fingers 11, 11 capable of closely straddling the coupling member 12 in the usual manner. Each end member 10 is axially bored to receive its shaft 13, being pinned thereto by pin 14, or otherwise suitably secured. The ears 11 are transversely perforated, preferably by a shouldered perforation, as indicated at 15 to receive a shouldered pivot pin 16, the shank of which projects through the ear 11 and through the wall of the coupling member 12 which is axially bored. The inner end of each pivot pin 16 is formed into a neck 17 subtended by a tip or head 18. Sleeved within the bore of the coupling 12 is the locking sleeve 19 which is longitudinally slotted with four slots 20, so as to form four parallel circumferentially-separated fingers 21 capable of straddling the necks 17. The width of slots 20 is just sufficient to closely fit necks 17 and heads 18 are of such form as to fit closely within locking sleeve 19, said locking sleeve being preferably a driving fit into the bore of coupling 12, although this is not essential, because shaft 13 at the entrance end will prevent accidental withdrawal.

The pins 16 are fitted closely into the perforations of ears 11 and coupling 12 but with a rotating fit. It has been found in practice that the diameter of a coupling must be at least double the diameter of the coupled shafts in order that the coupling may have sufficient strength and even in such a coupling the connecting pins are generally the weakest points because the necessary connecting threads materially reduce the effective diameters of those pins. In my present construction, the coupling is materially stronger than common couplings, because the pins have their full effective diameters due to their pivotal mounting in the ears and couplings.

In that type of coupling in which the pins are threaded into one or the other of the connected members, all pivotal action must take place in the other, or non-threaded, member, while in my present construction a "freezing" of the pin either in the coupling or in the ear, leaves the pin free to rotate in the associated member.

In assembling the parts, the ears 11 of the end members 10 will be straddled over the coupling 12 and the four pivot pins 16 projected into place, whereupon the locking sleeve 19 may be driven axially into either end of the bore of coupling 12 until its fingers 21 straddle the necks 17 and interlock with the heads 18. To disassemble the parts, it is merely necessary to withdraw locking sleeve 19.

I claim as my invention:

1. A universal joint comprising two end members, a coupling member longitudinally bored and transversely perforated to receive pivot pins, pivot pins headed at their outer ends and projected inward through the end members and the transverse perforations of the coupling member, and a locking member mounted in the longitudinal bore of the coupling member and having an interlocking engagement with a pivot pin.

2. A universal joint comprising two end members, an axially bored coupling member straddled by the end members, pivot pins headed at their outer ends and projected inward through the end members and through the wall of the coupling member upon axes transverse to the axes of the end members, and a locking member mounted in the bore of the coupling member and interlocking with the inner ends of the pivot pin.

3. A universal joint comprising two end members, an axially bored coupling member straddled by the end members, pivot pins projected through the end members and through the wall of the coupling member upon axes transverse to the axes of the end members, each of said pins having a headed neck at its inner end within the bore of the coupling member, and a longitudinally slotted locking sleeve projected into the bore of the coupling member and interlocking with the necked ends of the pivot pins.

4. A universal joint comprising two end members, a coupling member overlapping both said end members, pivot pins connecting each end member to said coupling member, said pivot pins being free to turn in both the coupling member and the associated end member without axial movement and being mounted in said end members and coupling member so as to be held against axial movement.

5. A universal joint comprising two end members, a coupling member overlapping both said end members, pivot pins connecting each end member to said coupling member, said end members and coupling member being provided with transverse holes into which said pivot pins are freely projected from the outside, said pivot pins being headed at both outer and inner ends so as to prevent separation of the coupling member and end members, and the inner heads being sufficiently small so that they will pass through the transverse holes in the coupling member.

6. A universal joint comprising two end members, a coupling member overlapping both said end members, pivot pins connecting each end member to said coupling member, said end members and coupling member being provided with transverse holes into which said pivot pins are freely projected from the outside, said pivot pins being headed at both outer and inner ends so as to prevent separation of the coupling member and end members, and a locking member coöperating with said inner heads for holding the pivot pins in place.

7. A universal joint comprising a forked end member, a coupling member fitted between parts of said forked end member, a pair of pivot pins each headed at both outer and inner ends and projecting transversely from the parts of said forked end member into said coupling member, a separate locking member coöperating with one set of heads of said pivot pins for holding them in place, and a second forked end member pivotally connected to said coupling member on an axis transverse to said pivot pins.

8. A universal joint comprising a forked end member, a one-piece coupling member fitted between parts of said forked end member, a pair of pivot pins having inner and outer retaining heads and connecting the respective parts of said forked end member to said coupling member, said inner and outer retaining heads serving to lock the parts of the end member to said coupling member to prevent spreading of the parts of the end member, and a second forked end member pivotally connected to said coupling member on an axis transverse to said pivot pins.

9. A universal joint comprising a forked end member, a coupling member fitted between parts of said forked end member, a pair of pivot pins having inner and outer retaining heads and connecting the respective parts of said forked end member to said coupling member, said inner and outer retaining heads serving to lock the parts of the end member to said coupling member to prevent spreading of the parts of the end member, the holes in said coupling member in which said pivot pins fit being as large in diameter as the inner retaining heads.

In witness whereof, I have hereunto set my hand at Richmond, Wayne county, Indiana, this 28th day of September, A. D. one thousand nine hundred and eighteen.

WILLIAM M. ZIEGLER.